(12) United States Patent
Teicholz et al.

(10) Patent No.: US 10,731,559 B2
(45) Date of Patent: Aug. 4, 2020

(54) LUBRICATION SYSTEM FOR GAS TURBINE ENGINES

(71) Applicant: United Technologies Corporation, Farmington, CT (US)

(72) Inventors: Matthew D. Teicholz, Mystic, CT (US); Francis Parnin, Suffield, CT (US); Richard Alan Weiner, Farmington, CT (US); Katherine A. Knapp Carney, Tolland, CT (US)

(73) Assignee: RAYTHEON TECHNOLOGIES CORPORATION

( * ) Notice: Subject to any disclaimer, the term of this patent is extended or adjusted under 35 U.S.C. 154(b) by 195 days.

(21) Appl. No.: 15/875,179

(22) Filed: Jan. 19, 2018

(65) Prior Publication Data
US 2018/0156116 A1    Jun. 7, 2018

Related U.S. Application Data

(63) Continuation of application No. 14/697,223, filed on Apr. 27, 2015, now Pat. No. 9,874,145.

(51) Int. Cl.
*F01D 25/18* (2006.01)
*F02C 7/06* (2006.01)
(Continued)

(52) U.S. Cl.
CPC ............... *F02C 7/06* (2013.01); *F01D 25/20* (2013.01); *F01M 1/16* (2013.01); *F02C 3/107* (2013.01);
(Continued)

(58) Field of Classification Search
CPC ...... F02C 7/06; F02C 7/36; F02C 7/14; F02C 3/107; F01D 25/18; F01D 25/20; F01M 1/16; F16H 57/0435
See application file for complete search history.

(56) References Cited

U.S. PATENT DOCUMENTS 2,258,792 A    4/1941  New
2,402,467 A    6/1946  Thompson
(Continued)

FOREIGN PATENT DOCUMENTS

EP    0791383    8/1997
EP    1142850   10/2001
(Continued)

OTHER PUBLICATIONS

Whitaker, R. (1982). ALF 502: plugging the turbofan gap. Flight International, p. 237-241, Jan. 30, 1982.
(Continued)

*Primary Examiner* — Steven M Sutherland
(74) *Attorney, Agent, or Firm* — Carlson, Gaskey & Olds, P.C.

(57) ABSTRACT

A lubrication system for a gas turbine engine according to an example of the present disclosure includes, among other things, a pump that moves a lubricant, a lubricant tank that stores the lubricant, a first engine component and a second engine component each requiring lubrication from the lubricant, a conduit between the lubricant tank and the first engine component and between the lubricant tank and the second engine component, a scheduling valve positioned in the conduit between the lubricant tank, and the first engine component and the second engine component, and a controller including a memory and a processor that controls the scheduling valve, wherein the memory includes an engine performance model, wherein the engine performance model includes stored relationship values between more than one condition experienced by the gas turbine engine during operation and a position of the scheduling valve, and wherein the scheduling valve varies a flow of the lubricant to the first engine component, the second engine component
(Continued)

and the lubrication tank based on comparing the more than one condition with the engine performance model.

26 Claims, 4 Drawing Sheets

(51) Int. Cl.
  *F01D 25/20* (2006.01)
  *F02C 7/14* (2006.01)
  *F01M 1/16* (2006.01)
  *F16H 57/04* (2010.01)
  *F02C 3/107* (2006.01)
  *F02C 7/36* (2006.01)
  *F01M 13/04* (2006.01)

(52) U.S. Cl.
  CPC ............... *F02C 7/14* (2013.01); *F02C 7/36* (2013.01); *F16H 57/0435* (2013.01); *F01M 2013/0472* (2013.01); *F05D 2260/53* (2013.01); *F16N 2250/08* (2013.01); *Y02T 50/671* (2013.01)

(56) References Cited

U.S. PATENT DOCUMENTS

| | | | |
|---|---|---|---|
| 2,936,655 A | 5/1960 | Peterson et al. | |
| 3,021,731 A | 2/1962 | Stoeckicht | |
| 3,194,487 A | 7/1965 | Tyler et al. | |
| 3,287,906 A | 11/1966 | McCormick | |
| 3,352,178 A | 11/1967 | Lindgren et al. | |
| 3,412,560 A | 11/1968 | Gaubatz | |
| 3,747,343 A | 7/1973 | Rosen | |
| 3,754,484 A | 8/1973 | Roberts | |
| 3,820,719 A | 6/1974 | Clark | |
| 3,892,358 A | 7/1975 | Gisslen | |
| 3,932,058 A | 1/1976 | Harner et al. | |
| 3,935,558 A | 1/1976 | Miller et al. | |
| 3,988,889 A | 11/1976 | Chamay et al. | |
| 4,130,872 A | 12/1978 | Harloff | |
| 4,284,174 A | 8/1981 | Salvana et al. | |
| 4,478,551 A | 10/1984 | Honeycutt, Jr. et al. | |
| 4,649,114 A | 3/1987 | Miltenburger et al. | |
| 4,696,156 A | 9/1987 | Burr et al. | |
| 4,979,362 A | 12/1990 | Vershure, Jr. | |
| 5,067,454 A | 11/1991 | Waddington et al. | |
| 5,102,379 A | 4/1992 | Pagluica et al. | |
| 5,141,400 A | 8/1992 | Murphy et al. | |
| 5,317,877 A | 6/1994 | Stuart | |
| 5,433,674 A | 7/1995 | Sheridan et al. | |
| 5,447,411 A | 9/1995 | Curley et al. | |
| 5,466,198 A | 11/1995 | McKibbin et al. | |
| 5,524,847 A | 6/1996 | Brodell et al. | |
| 5,677,060 A | 10/1997 | Terentieva et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 5,985,470 A | 11/1999 | Spitsberg et al. | |
| 6,223,616 B1 | 5/2001 | Sheridan | |
| 6,315,815 B1 | 11/2001 | Spadaccini et al. | |
| 6,318,070 B1 | 11/2001 | Rey et al. | |
| 6,387,456 B1 | 5/2002 | Eaton, Jr. et al. | |
| 6,517,341 B1 | 2/2003 | Brun et al. | |
| 6,607,165 B1 | 8/2003 | Manteiga et al. | |
| 6,626,141 B2 | 9/2003 | Choi | |
| 6,709,492 B1 | 3/2004 | Spadaccini et al. | |
| 6,814,541 B2 | 11/2004 | Evans et al. | |
| 7,021,042 B2 | 4/2006 | Law | |
| 7,328,580 B2 | 2/2008 | Lee et al. | |
| 7,374,403 B2 | 5/2008 | Decker et al. | |
| 7,591,754 B2 | 9/2009 | Duong et al. | |
| 7,662,059 B2 | 2/2010 | McCune | |
| 7,806,651 B2 | 10/2010 | Kennepohl et al. | |
| 7,824,305 B2 | 11/2010 | Duong et al. | |
| 7,926,260 B2 | 4/2011 | Sheridan et al. | |
| 7,997,868 B1 | 8/2011 | Liang et al. | |
| 8,205,432 B2 | 6/2012 | Sheridan | |
| 8,651,240 B1* | 2/2014 | Motto ............... | F01D 25/18 184/7.4 |
| 2006/0054406 A1 | 3/2006 | Delaloye | |
| 2007/0169997 A1 | 7/2007 | Delaloye | |
| 2008/0003096 A1 | 1/2008 | Kohli et al. | |
| 2008/0116009 A1 | 5/2008 | Sheridan et al. | |
| 2008/0196383 A1 | 8/2008 | Delaloye | |
| 2008/0317588 A1 | 12/2008 | Grabowski et al. | |
| 2009/0056343 A1 | 3/2009 | Suciu et al. | |
| 2010/0105516 A1 | 4/2010 | Sheridan et al. | |
| 2010/0148396 A1 | 6/2010 | Xie et al. | |
| 2010/0212281 A1 | 8/2010 | Sheridan | |
| 2010/0218483 A1 | 9/2010 | Smith | |
| 2010/0294597 A1 | 11/2010 | Parnin | |
| 2010/0331139 A1 | 12/2010 | McCune | |
| 2011/0159797 A1 | 6/2011 | Beltman et al. | |
| 2011/0293423 A1 | 12/2011 | Bunker et al. | |
| 2012/0124964 A1 | 5/2012 | Hasel et al. | |
| 2013/0022446 A1 | 1/2013 | Chevillot et al. | |
| 2013/0319006 A1* | 12/2013 | Parnin ............... | F01D 25/18 60/805 |
| 2014/0026583 A1 | 1/2014 | Care et al. | |
| 2014/0150439 A1 | 6/2014 | Parnin et al. | |

FOREIGN PATENT DOCUMENTS

| | | |
|---|---|---|
| EP | 2572987 | 3/2013 |
| GB | 1516041 | 6/1978 |
| GB | 2041090 | 9/1980 |
| GB | 2248278 | 4/1992 |
| GB | 2426792 | 12/2006 |
| WO | 2007038674 | 4/2007 |
| WO | 2015047885 | 4/2015 |

OTHER PUBLICATIONS

Munt, R. (1981). Aircraft technology assessment: Progress in low emissions engine. Technical Report. May 1981. pp. 1-171.
Naters, M.N. and Schairer, E.T. (1977). Analysis of turbofan propulsion system weight and dimension& NASA Technical Memorandum. Jan. 1977. pp. 1-65.
Avco Lycoming Divison. ALF 502L Maintenance Manual. Apr. 1981. pp. 1-118.
Type Certificate Data Sheet No. E6NE. Department of Transportation Federal Aviation Administration. Jun. 7, 2002. pp. 1-10.
Trembley, Jr., H.F. (1977). Determination of effects of ambient conditions on aircraft engine emissions. Prepared for Environmental Protection Agency. Ann Arbor, Michigan. Sep. 1977 pp. 1-256.
Honeywell LF502. Jane's Aero-engines, Aero-engines—Turbofan. Feb. 9, 2012.
Honeywell LF502. Jane's Aero-engines, Aero-engines—Turbofan. Aug. 17, 2016.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Rauch, D. (1972). Design study of an air pump and integral lift engine ALF-504 using the Lycoming 502 core. Prepare for NASA. Jul. 1972. pp. 1-182.
Dassault Falcon 900EX Easy Systems Summary. Retrieved from: http://www.smartcockpit.com/docs/F900EX-Engines.pdf pp. 1-31.
Honeywell TFE731 Pilot Tips. pp. 1-143.
Honeywell TFE731-5AR to -5BR Engine Conversion Program. Sep. 2005. pp. 1-4.
Garret TFE731 Turbofan Engine (CAT C). Chapter 79: Lubrciation System. TTFE731 Issue 2. 2010. pp. 1-24.
McArdle, J.G. (1979). Static test-stand performance of the YF-102 turbofan engine with several exhaust configurations for the quiet short-haul research aircraft (QSRA). Nasa Technical Paper. Nov. 1979. pp. 1-68.

(56) References Cited

OTHER PUBLICATIONS

Johnston, R.P., Hirschkron, R., Koch, C.C., Neitzel, R.E., and Vinson, P.W. (1978). Energy efficient engine: Preliminary design and integration study—final report NASA CR-135444. Sep. 1978. pp. 1-401.

Johnston, R.P. and Hemsworth, M.C. (1978). Energy efficient engine preliminary design and integration studies. Jun. 1, 1978. pp. 1-28.

Awker, R.W. (1986). Evaluation of propfan propulsion applied to general aviation. NASA CR-175020. Mar. 1, 1986. pp. 1-140.

Howe, D.C. and Wynosky, T.A. (1985). Energy efficient engine program advanced turbofan nacelle definition study. NASA CR-174942. May 1, 1985. pp. 174.

Singh, B. (1986). Small engine component technology (SECT) study. NASA CR-175079. Mar. 1, 1986. pp. 1-102.

Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.

Anderson, R.D. (1985). Advanced Propfan Engine Technology (APET) definition study, single and counter-rotation gearbox/pitch change mechanism design. NASA CR-168115. Jul. 1, 1985. pp. 1-289.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.

Gliebe, P.R., Ho, P.Y., and Mani, R. (1995). UHB engine fan and broadband noise reduction study. NASA CR-198357. Jun. 1995. pp. 1-48.

Holcombe, V. (2003). Aero-Propulsion Technology (APT) task V low noise ADP engine definition study. NASA CR-2003-212521. Oct. 1, 2003. pp. 1-73.

Sutliff, D. (2005). Rotating rake turbofan duct mode measurement system. NASA TM-2005-213828. Oct. 1, 2005. pp. 1-34.

Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.

NASA Conference Publication. (1978). CTOL transport technology. NASA-CP-2036-PT-1. Jun. 1, 1978. pp. 1-531.

Gray, D.E. (1978). Energy efficient engine preliminary design and integration studies. NASA-CP-2036-PT-1. Nov. 1978. pp. 89-110.

Kandebo, S.W. (1993). Pratt & Whitney launches geared turbofan engine. Aviation Week & Space Technology, 148(8). p. 32-4.

Kandebo, S.W. (1993). Geared-Turbofan engine design targets cost, complexity. Aviation Week & Space Technology, 148(8). p. 34-5.

Davis, D.G.M. (1973). Variable-pitch fans: Progress in Britain. Flight International. Apr. 19, 1973. pp. 615-617.

Levintan, R.M. (1975). Q-Fan demonstrator engine. Journal of Aircraft. vol. 12( 8). Aug. 1975. pp. 658-663.

Aerospace Information Report. (2008). Advanced ducted propulsor in-flight thrust determination. SAE International AIR5450. Aug. 2008. p. 1-392.

Technical Report. (1975). Quiet Clean Short-haul Experimental Engine (QCSEE) UTW fan preliminary design. NASA-CR-134842. Feb. 1, 1975. pp. 1-98.

Daggett, D.L., Brown, S.T., and Kawai, R.T. (2003). Ultra-efficient engine diameter study. NASA/CR-2003-212309. May 2003. pp. 1-52.

Technical Report. (1975). Quiet Clean Short-haul Experimental Engine (QCSEE) Under-the-Wing (UTW) final design report. NASA-CR-134847. Jun. 1, 1977. pp. 1-697.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Middleton, P. (1971). 614: VFW's jet feederliner. Flight International, Nov. 4, 1971. p. 725, 729-732.

Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-31.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.

Baker, R.W. (2000). Membrane technology and applications. New York, NY: McGraw-Hill. pp. 87-151.

Cheryan, M. (1998). Ultrafiltration and microfiltration handbook. Lancaster, PA: Tecnomic Publishing Company, Inc. pp. 171-236.

Seader, J.D. and Henley, E.J. (1998). Separation process principles. New York, NY: John Wiley & Sons, Inc. pp. 722-6 and 764-71.

Spadaccini, L.J., and Huang, H. (2002). On-line fuel deoxygenation for coke suppression. ASME, Jun. 2002. pp. 1-7.

Darrah, S. (1987). Jet fuel deoxygenation. Interim Report for Period Mar. 1987-Jul. 1988. pp. 1-22.

Bucknell, R.L. (1973). Influence of fuels and lubricants on turbine engine design and performance, fuel and lubricant analyses. Final Technical Report, Mar. 1971-Mar. 1973. pp. 1-252.

Hazlett, R.N. (1991). Thermal oxidation stability of aviation turbine fuels. Philadelphia, PA: ASTM. pp. 1-163.

Taylor, W.F. (1974). Deposit formation from deoxygenated hydrocarbons. I. General features. Ind. Eng. Chem., Prod. Res. Develop., vol. 13(2). 1974. pp. 133-138.

Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.

Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.

Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.

Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.

Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.

Edwards, T. and Zabarnick, S. (1993). Supercritical fuel deposition mechanisms. Ind. Eng. Chem. Res. vol. 32. 1993. pp. 3117-3122.

Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.

Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.

Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

Technical Data. Teflon. WS Hampshire Inc. Retrieved from: http://catalog.wshampshire.com/Asset/psg_teflon_pffe.pdf.

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.

Waters, M.H. and Schairer, E.T. (1977). Analysis of turbofan propulsion system weight and dimension. NASA Technical Memorandum. Jan. 1977. pp. 1-65.

(56) References Cited

OTHER PUBLICATIONS

Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times. Jul. 13, 2008. pp. C6.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., MBA, D., Brown, D. (2003). Determining power losses in the helical gear mesh; Case Study. ASME 2003 Design Engineering Technical Conferences. Chicago, IL. Sep. 2-6, 2003. pp. 1-7.
Thulin, R.D., Howe, D.C., and Singer, I.D. (1982). Energy efficient engine: High pressure turbine detailed design report. Prepared for NASA. NASA CR-165608. Received Aug. 9, 1984. pp. 1-178.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-151.
Agarwal, B.D and Broutman, L.J. (1990). Analysis and performance of fiber composites, 2nd Edition. John Wiley & Sons, Inc. New York: New York. pp. 1-30, 50-1, 56-8, 60-1, 64-71, 87-9, 324-9, 436-7.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers, 108(8), 65-67.
Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CC-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.

(56) References Cited

OTHER PUBLICATIONS

Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Appl. No. 8,844,265. Executed Jun. 28, 2016. pp. 1-91.
Declaration of John Eaton, Ph.D. In re U.S. Appl. No. 8,869,568. Executed Mar. 28, 2016. pp. 1-87.
Declaration of Reza Abhari. In re U.S. Appl. No. 8,695,920. Executed Nov. 30. pp. 1-67.
Declaration of Reza Abhari. In re U.S. Appl. No. 8,448,895. Executed Nov. 28. pp. 1-81.
Declaration of Reza Abhari. In re U.S. Appl. No. 8,695,920, claims 1-4, 7-14, 17 and 19. Executed Nov. 29. pp. 1-102.
Declaration of Dr. Magdy Attia. In re U.S. Appl. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Appl. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003.. p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compound& Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of $MoSi_2$-based alloys and composites. Materials Science and Engineering, A155, 1992. pp. 147-158.
Shah, D.M. (1992). $MoSi_2$ and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28 (9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76 (1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of a C/SiC composites with Si-$MoSi_2$ oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.

(56) References Cited

OTHER PUBLICATIONS

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L, Stach, E.A, and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press. pp. 215-219 and 855-860.
Bunker, R.S. (2005). A review of shaped hole turbine film-cooling technology. Journal of Heat Transfer vol. 127. Apr. 2005. pp. 441-453.
European Search Report for EP Application No. 16166927 dated Sep. 7, 2016.
2003 NASA seal/secondary air system workshop. (2003). NASA/CP-2004-212963/VOL1. Sep. 1, 2004. pp. 1-408.
Berton, J.J. and Guynn, M.D. (2012). Multi-objective optimization of a turbofan for an advanced, single-aisle transport. NASA/TM-2012-217428. pp. 1-26.
Chapman, J.W. and Litt, J.S. (2017). Control design for an advanced geared turbofan engine. AIAA Joint Propulsion Conference 2017. Jul. 10, 2017-Jul. 12, 2017. Atlanta, GA. pp. 1-12.
Dalton, III., W.N. (2003). Ultra high bypass ratio low noise engine study. NASA/CR-2003-212523. Nov. 2003. pp. 1-187.
Edkins, D.P., Hirschkron, R., and Lee, R. (1972). TF34 turbofan quiet engine study. Final Report prepared for NASA. NASA-CR-120914. Jan. 1, 1972. pp. 1-99.
Fisher, K., Berton, J., Guynn, M., Haller B., Thurman, D., and Tong, M. (2012). NASA's turbofan engine concept study for a next-generation single-aisle transport Presentation to ICAO's noise technology independent expert panel. Jan. 25, 2012. pp. 1-23.
Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/VOL1. pp. 1-187.
Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.
Guynn, M.D., Berton, J.J., Fisher, K.L., Haller, W.J., Tong, M. T., and Thurman, D.R. (2009). Analysis of turbofan design options for an advanced single-aisle transport aircraft. American Institute of Aeronautics and Astronautics. pp. 1-13.
Mavris, D.N., Schutte, J.S. (2016). Application of deterministic and probabilistic system design methods and enhancements of conceptual design tools for ERA project final report. NASA/CR-2016-219201. May 1, 2016. pp. 1-240.
McCracken, R.C. (1979). Quiet short-haul research aircraft familiarization document. NASA-TM-81149. Nov. 1, 1979. pp. 1-76.

Litt, J.S. (2018). Sixth NASA Glenn Research Center propulsion control and diagnostics (PCD) workshop. NASA/CP-2018-219891. Apr. 1, 2018. pp. 1-403.
Rotordynamic instability problems in high-performance turbomachinery. (1986). NASA conference publication 2443. Jun. 2-4, 1986.
Sargisson, D.F. (1985). Advanced propfan engine technology (APET) and single-rotation gearbox/pitch change mechanism. NASA Contractor Report—168113. R83AEB592. Jun. 1, 1985. pp. 1-476.
Singh, R. and Houser, D.R. (1990). Non-linear dynamic analysis of geared systems. NASA-CR-180495. Feb. 1, 1990. pp. 1-263.
Smith, C.E, Hirschkron, R., and Warren, R.E. (1981). Propulsion system study for small transport aircraft technology (STAT). Final report. NASA-CR-165330. May 1, 1981. pp. 1-216.
Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.
Bloomer, H.E., Loeffler, L.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.
Bloomer, H.E. and Samanich, N.E. (1982). QCSEE under-the-wing engine acoustic data. NASA-TM-82691. May 1, 1982. pp. 1-28.
Bloomer, H.E. and Loeffler, I.J. (1982). QCSEE over-the-wing engine acoustic data. NASA-TM-82708. May 1, 1982. pp. 1-558.
Bloomer, H.E. and Samanich, N.E. (1982). QCSEE under-the-wing enging-wing-flap aerodynamic profile characteristics. NASA-TM-82890. Sep. 1, 1982. pp. 1-48.
Howard, D.F. (1976). QCSEE preliminary under the wing flight propulsion system analysis report. NASA CR-134868. Feb. 1, 1976. pp. 1-260.
Misel, O.W. (1977). QCSEE main reduction gears test program. NASA CR-134669. Mar. 1, 1977. pp. 1-222.
QCSEE Preliminary analyses and design report. vol. 1. (1974). NASA-CR-134838. Oct. 1, 1974. pp. 1-337.
QCSEE preliminary analyses and design report vol. II (1974). NASA-CR-134839. Oct. 1, 1974. pp. 340-630.
QCSEE under-the-wing engine composite fan blade design. (1975). NASA-CR-134840. May 1, 1975. pp. 1-51.
QCSEE the aerodynamic and preliminary mechanical design of the QCSEE OTW fan. (1975). NASA-CR-134841. Feb. 1, 1975. pp. 1-74.
QCSEE under-the-wing engine composite fan blade preliminary design test report. (1975). NASA-CR-134846. Sep. 1, 1975. pp. 1-56.
QCSEE over-the-wing final design report. (1977). NASA-CR-134848. Jun. 1, 1977. pp. 1-503.
QCSEE hamilton standard cam/harmonic drive variable pitch fan actuation system derail design report. (1976). NASA-CR-134852. Mar. 1, 1976. pp. 1-172.
QCSEE main reduction gears bearing development program final report. (1975). NASA-CR-134890. Dec. 1, 1975. pp. 1-41.
QCSEE under-the-wing engine digital control system design report. (1978). NASA-CR-134920. Jan. 1, 1978. pp. 1-309.
QCSEE the aerodynamic and mechanical design of the QCSEE under-the-wing fan. (1977). NASA-CR-135009. Mar. 1, 1977. pp. 1-137.
OCSEE under-the-wing engine composite fan blade final design test report. (1977). NASA-CR-135046. Feb. 1, 1977. pp. 1-55.
QCSEE over-the-wing propulsion system test report vol. III—mechanical performance. (1978). NASA-CR-135325. Feb. 1, 1978. pp. 1-112.
QCSEE ball spline pitch-change mechanism whirligig test report (1978). NASA-CR-135354. Sep. 1, 1978. pp. 1-57.
Quiet clean general aviation turbofan (QCGAT) technology study final report vol. I. (1975). NASA-CR-164222. Dec. 1, 1975. pp. 1-186.
Neitzel, R.E., Hirschkron, R. and Johnston, R.P. (1976). Study of unconventional aircraft engines designed for low energy consumption. NASA-CR-135136. Dec. 1, 1976. pp. 1-153.
Neitzel, R., Lee, R., and Chamay, A.J. (1973). Engine and installation preliminary design. Jun. 1, 1973. pp. 1-333.

(56) References Cited

OTHER PUBLICATIONS

Parametric study of STOL short-haul transport engine cycles and operational techniques to minimize community noise impact. NASA-CR-114759. Jun. 1, 1974. pp. 1-398.
Sowers, H.D. and Coward, W.E. (1978). QCSEE over-the-wing (OTW) engine acuostic design. NASA-CR-135268. Jun. 1, 1978. pp. 1-52.
Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.

* cited by examiner

LUBRICATION SYSTEM FOR GAS TURBINE ENGINES

CROSS-REFERENCE TO RELATED APPLICATION

The present disclosure is a continuation of U.S. patent application Ser. No. 14/697,223, filed Apr. 27, 2015.

BACKGROUND OF THE INVENTION

This disclosure generally relates to gas turbine engines and, more particularly, relates to a lubrication system for gas turbine engine components.

Many modern aircraft, as well as other vehicles and industrial processes, employ gas turbine engines for generating energy and propulsion. Such engines include a fan, compressor, combustor and turbine provided in serial fashion, forming an engine core and arranged along a central longitudinal axis. Air enters the gas turbine engine through the fan and is pressurized in the compressor. This pressurized air is mixed with fuel in the combustor. The fuel-air mixture is then ignited, generating hot combustion gases that flow downstream to the turbine. The turbine is driven by the exhaust gases and mechanically powers the compressor and fan via one or more central rotating shafts. Energy from the combustion gases not used by the turbine is discharged through an exhaust nozzle, producing thrust to power the aircraft.

Turbofan gas turbine engines contain an engine core and fan surrounded by a fan case, forming part of a nacelle. The nacelle is a housing that contains the engine. The fan is positioned forward of the engine core and within the fan case. The engine core is surrounded by an engine core cowl and the area between the nacelle and the engine core cowl is functionally defined as a fan duct. The fan duct is substantially annular in shape to accommodate the airflow from the fan and around the engine core cowl. The airflow through the fan duct, known as bypass air, travels the length of the fan duct and exits at the aft end of the fan duct at an exhaust nozzle.

In addition to thrust generated by combustion gasses, the fan of gas turbine engines also produces thrust by accelerating and discharging ambient air through the exhaust nozzle. Various parts of the gas turbine engine generate heat while operating, including the compressor, combustor, turbine, central rotating shaft and fan. To maintain proper operational temperatures, excess heat is often removed from the engine via oil coolant loops, including air/oil or fuel/oil heat exchangers, and dumped into the bypass airflow for removal from the system.

Gas turbine engines require a supply of lubricant, such as oil, to mechanical components such as, but not limited to, bearings, seals, and the like. The oil can be used as a lubricant, a coolant or both. Typical oil systems supply the oil to a manifold, which then directs the oil to various engine components. The lubricant may be filtered to remove unwanted debris, and may also be de-aerated to remove any air absorbed by the oil while lubricating and cooling the components. An oil cooler may remove heat gained from the lubricated components.

In prior art oil systems, the quantity of oil pumped to the components is typically based on speed or load conditions. However, either approach may result in an oversupply of oil in low load conditions, such as during cruise or taxiing, for example. This reduces the efficiency of the engine in that the excess oil is pumped through the engine. Additionally, the lubricant then needs to be cooled before being used again, increasing the demands on the coolers and further reducing efficiency. In light of the foregoing, it can be seen that an oil system is needed that can provide oil in the quantity required according to a range of conditions being experienced by the engine.

Accordingly, there is a need for an improved lubrication schedule for a gas turbine engine.

SUMMARY OF THE INVENTION

To meet the needs described above and others, the present disclosure provides a lubrication system for a gas turbine engine, that may include a pump for moving a lubricant, a lubricant tank for storing the lubricant, an engine component requiring lubrication from the lubricant, a conduit between the lubricant tank and the engine component, and a scheduling valve positioned in the conduit between the lubricant tank and the engine component, the flow scheduling valve varying a flow of the lubricant to the engine component based on a condition.

The engine component may be a fan drive gear system, and the scheduling valve may be controlled by a controller. Additionally, the controller may include a memory and a processor, and the memory may include an engine performance model. The condition may be a calculated engine torque, an engine startup, cruising, an altitude of the gas turbine engine, a vibration level of the gas turbine engine, or a weight on wheels.

The present disclosure also provides a gas turbine engine, that may include a compressor, a combustor downstream of the compressor, a lubrication system including a pump for moving a lubricant, a lubricant tank for storing the lubricant, an engine component requiring lubrication from the lubricant, a conduit between the lubricant tank and the engine component, a scheduling valve positioned in the conduit between the lubricant tank and the engine component, the flow scheduling valve varying a flow of the lubricant to the engine component based on a condition, and a turbine downstream of the combustor.

The engine component may be a fan drive gear system, and the scheduling valve may be controlled by a controller. Further, the controller may include a memory and a processor, and the memory may include an engine performance model. The condition may be a calculated engine torque, an altitude of the gas turbine engine or a vibration level of the gas turbine engine.

The present disclosure further provides a method of lubricating an engine component of a gas turbine engine that may include pumping a lubricant from a lubricant tank through a conduit to the engine component using a pump, determining a condition experienced by the gas turbine engine, and regulating a flow of the lubricant to the engine component with a scheduling valve, the regulation of the flow of lubricant based upon the condition experienced by the gas turbine engine.

The engine component may be a fan drive gear system, and the scheduling valve may be controlled by a controller, wherein the controller may include a memory and a processor, and the memory may include an engine performance model.

These, and other aspects and features of the present disclosure, will be better understood upon reading the following detailed description when taken in conjunction with the accompanying drawings.

BRIEF DESCRIPTION OF THE DRAWINGS

For further understanding of the disclosed concepts and embodiments, reference may be made to the following detailed description, read in connection with the drawings, wherein like elements are numbered alike, and in which.

It is to be noted that the appended drawings illustrate only exemplary embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Figure 1:
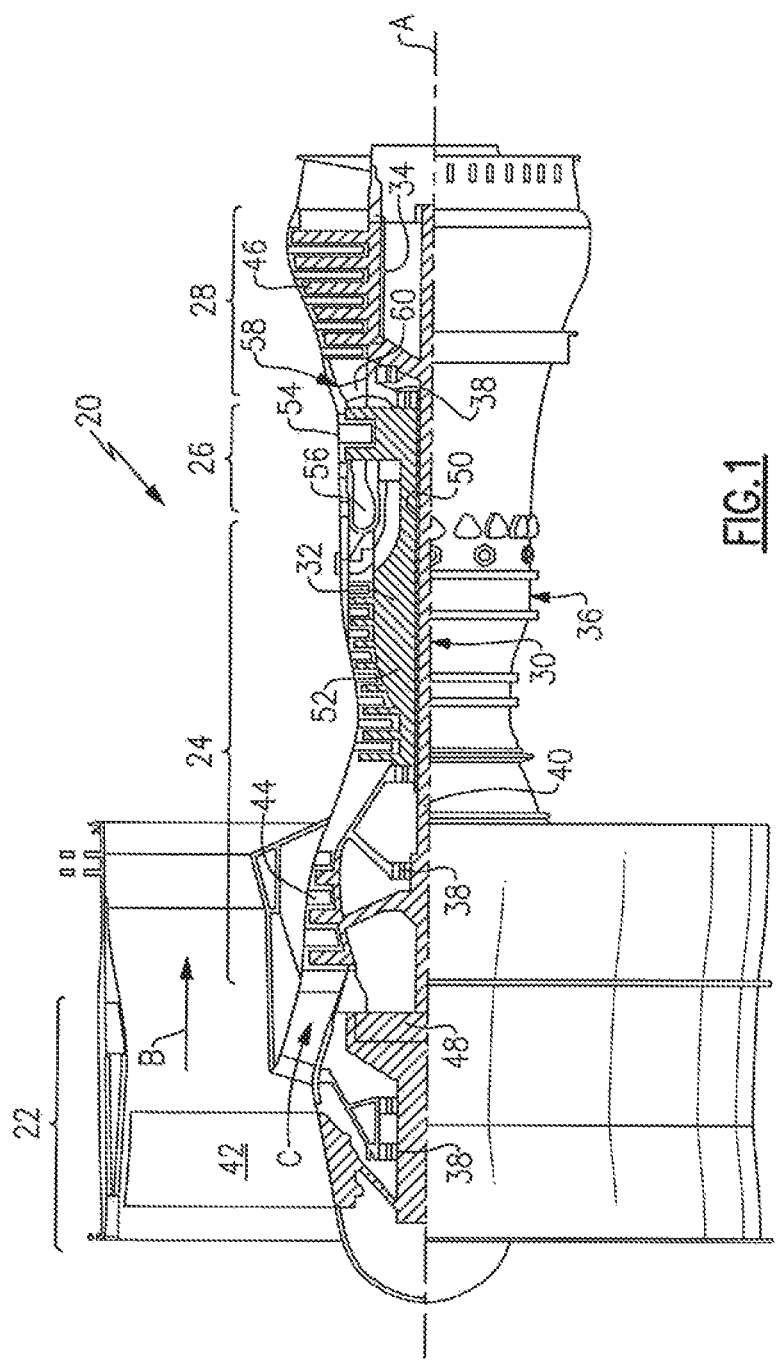
FIG. 1 is a sectional view of a gas turbine engine constructed in accordance with an embodiment.

Referring now to the drawings, and with specific reference to FIG. 1, a gas turbine engine 20 is generally referred to by reference numeral 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of geared architecture 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about "Low corrected fan tip speed" is the actual fan tip speed in ft/sec divided by an industry standard temperature correction of $[(\text{Tram } ° R) I (518.7° R)]^{0.5}$. The "Low corrected fan tip speed" as disclosed herein according to one non-limiting embodiment is less than about 1150 ft/second.

Figure 2:
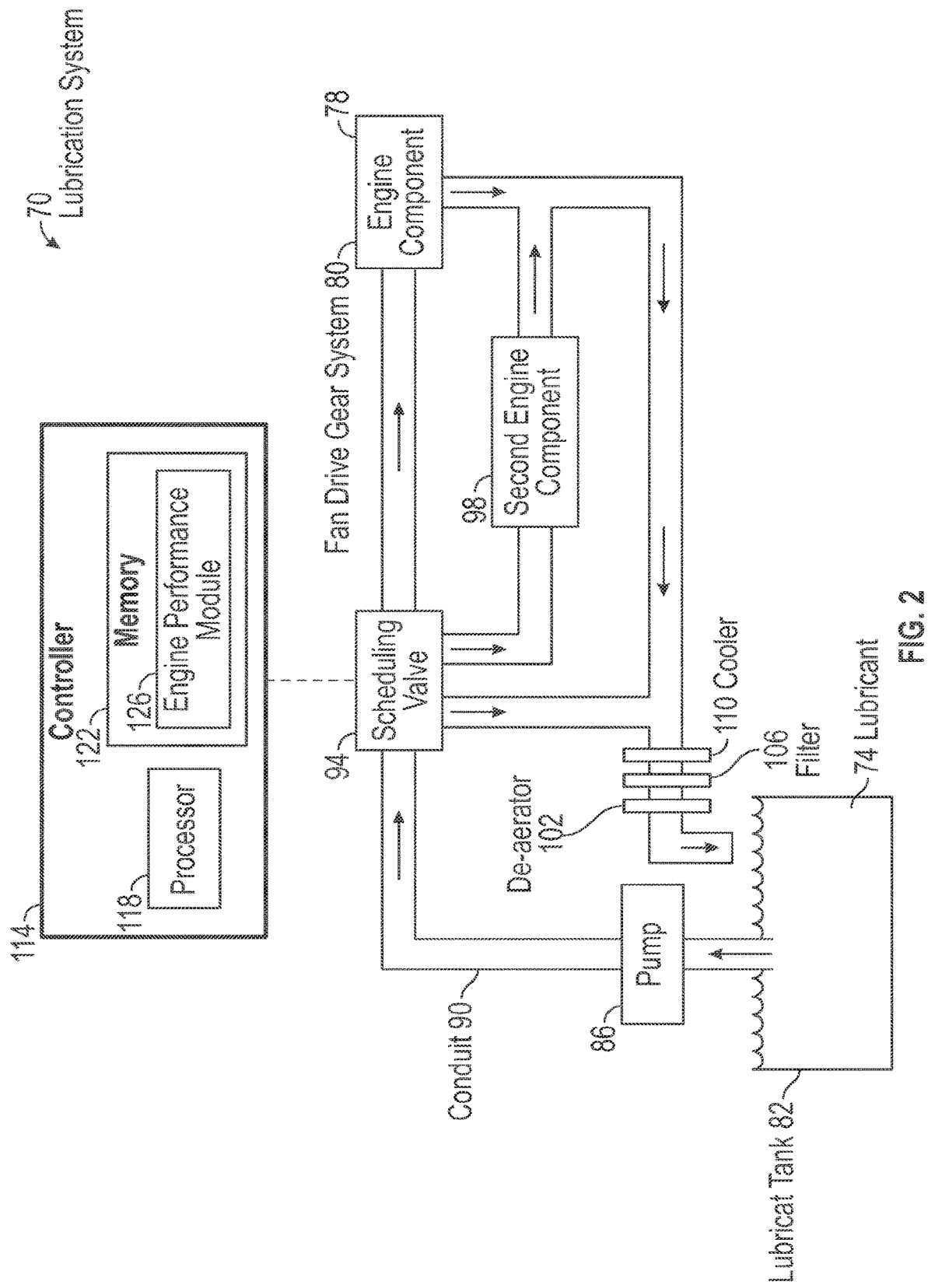
FIG. 2 is a schematic representation of a lubrication injection system constructed in accordance with an embodiment.

A lubrication system 70 may be used to supply a lubricant 74 to an engine component 78 as shown in FIG. 2. The lubricant 74 may serve to lubricate, cool or supply another substance to various parts of the gas turbine engine 20. In one embodiment, the engine component 78 may be a fan drive gear system 80, which may be defined as an apparatus that allows the fan 42 to rotate at a different angular speed from the low speed spool 30.

In operation, components of the gas turbine engine 20 may require lubrication or cooling. The lubrication system 70 may include a lubricant tank 82, or sump, for storing the lubricant 74 when not being used. The lubrication system 70 may also include a pump 86 for drawing a supply of lubricant 74 from the lubricant tank 82 through a conduit 90. The conduit 90 may travel between the lubricant tank 82 and a scheduling valve 94, and between other gas turbine engine 20 components. The pump 86 may be driven by a rotating component of the gas turbine engine 20, or by other means. The pump 86 may further supply a constant or varying flow of lubricant 74 to the scheduling valve 94.

Upon reaching the scheduling valve 94, the lubricant 74 may be wholly or partially diverted to one of multiple areas by the scheduling valve 94. In one scenario, the lubricant 74 may be sent to an engine component 78 for use. In another scenario, the lubricant 74 may be sent to a second engine component 98 for use. In a third scenario, the lubricant 74 may be sent back to the lubricant tank 82. In a fourth scenario, the lubricant 74 may be sent to any two or three of the engine component 78, second engine component 98 and lubricant tank 82. Further, although not shown, the lubricant 74 may also be sent to additional parts of the gas turbine engine 20. Following lubricant 74 use in gas turbine engine 20 components, the lubricant may travel back to the lubricant tank 82.

During its use, the lubricant 74 may acquire adverse properties while being pumped and used throughout the lubrication system 70, including becoming aerated, accumulating debris and absorbing heat. To address these properties, the lubrication system 70 may include, respectively, a de-aerator 102, a filter 106 and a cooler 110. These three elements 102, 106, 110 may be located at various points within the lubrication system 70. Further, although shown with one of each of the elements, the lubrication system 70 may include more than one of any of them.

While in operation, gas turbine engine 20 components need a degree of lubricant 74 flow for proper functionality. This flow amount may vary according to different demands and situations. However, pumping and receiving more than a certain required degree of lubricant 74 can needlessly affect overall gas turbine engine 20 efficiency, as more lubricant 74 than necessary is pumped, cooled, de-aerated and filtered.

In order to provide gas turbine engine 20 components with adequate lubrication, the scheduling valve 94 may regulate a flow of lubricant 74 to an engine component 78, second engine component 98 or lubricant tank 82, as described above. The scheduling valve 94 may regulate such flows in response to a condition experienced by the gas turbine engine 20. Additionally, the scheduling valve 94 may regulate such lubricant flows in response to more than one condition experienced by the gas turbine engine 20. A condition may be indicated by a sensor, calculation, operator input or stored information, and may serve to provide data about the current, past or future state of the gas turbine engine 20.

The gas turbine engine 20 may include a controller 114, which may further incorporate a processor 118 and a memory 122. The memory 122 may include an engine performance model 126. Additionally, the controller 114 may also be a Full Authority Digital Engine Control, or FADEC. The engine performance model 126 may include a series of stored algorithms able to input a condition and, after analysis by the stored algorithms, signal the controller 114 to output a command to a component of the gas turbine engine 20, such as the scheduling valve 94. In this manner, one or more conditions can be detected and responded to by commanding a response from a component or system of the gas turbine engine 20.

The controller 114 may also receive feedback from the scheduling valve 94 indicating the position of the scheduling valve 94. Such feedback may be used by the controller 114 to verify the position of the scheduling valve 94, or to calculate a future scheduling valve 94 movement.

Figure 3:
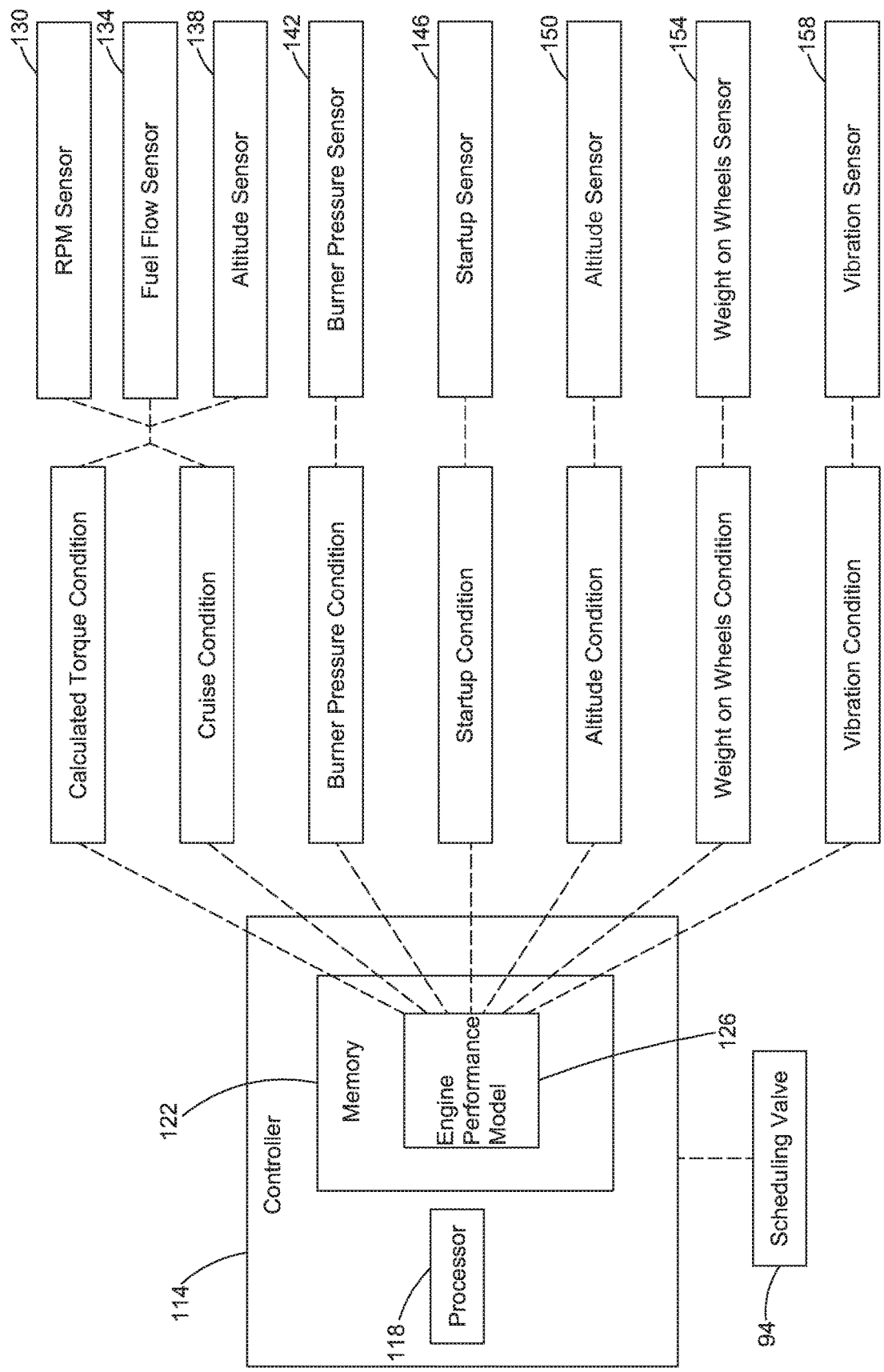
FIG. 3 is a schematic representation of a controller and associated engine conditions the controller may monitor according to an embodiment.

The engine performance model 126 can respond to a range of conditions, as shown in FIG. 3. In a first example, an RPM sensor 130, a fuel flow sensor 134 and an altitude sensor 138 can be used to gather data and provide a calculated torque condition for the fan 42, low speed spool 30, engine component 78 or fan drive gear system 80. Such a calculated torque condition can be provided to the engine performance model 126, which can then signal the controller 114 to output a command to the scheduling valve 94. The engine performance model 126 may include stored relationship values between a calculated torque condition and a scheduling valve 94 position to provide a desired flow rate of lubricant 74 to one or more components of the gas turbine engine 20. In this manner, a calculated torque condition can determine a scheduling valve 124 position, and thus a lubricant 74 flow rate, to an engine component 78.

By the same process, the RPM sensor 130, fuel flow sensor 134 and altitude sensor 138 can be used to gather data and provide a cruise condition for the fan 42, low speed spool 30, engine component 78 or fan drive gear system 80. Cruise condition may be defined as operation below a maximum level, and sustained within a relatively narrow range of operation. Such a cruise condition can be provided to the engine performance model 126, which can then signal the controller 114 to output a command to the scheduling valve 94. The engine performance model 126 may include stored relationship values between a cruise condition and a scheduling valve 94 position to provide a desired flow rate of lubricant 74 to one or more components of the gas turbine engine 20. In this manner, a cruise condition can determine a scheduling valve 124 position, and thus a lubricant 74 flow rate, to an engine component 78.

Similarly, a burner pressure sensor 142 can be used to gather burner data for the engine performance model 126, which can then signal the controller 114 to output a command to the scheduling valve 94. The burner pressure sensor 142 may sense a pressure of a flow, region or process within the combustor 26. The engine performance model 126 may include stored relationship values between a burner pressure condition and a scheduling valve 94 position to provide a desired flow rate of lubricant 74 to one or more components of the gas turbine engine 20.

Additionally, a startup sensor 146 can be used to gather data indicating a startup condition for the engine performance model 126, which can then signal the controller 114 to output a command to the scheduling valve 94. Startup may be defined as a process during which the gas turbine engine 20 transitions from a non-operating state to an operating state. The engine performance model 126 may include stored relationship values between a startup condition and a scheduling valve 94 position to provide a desired flow rate of lubricant 74 to one or more components of the gas turbine engine 20.

Further, an altitude sensor 150 can be used to gather data indicating an altitude of the gas turbine engine 20 for the engine performance model 126, which can then signal the controller 114 to output a command to the scheduling valve

94. The engine performance model 126 may include stored relationship values between an altitude condition and a scheduling valve 94 position to provide a desired flow rate of lubricant 74 to one or more components of the gas turbine engine 20.

A weight on wheels sensor 154 can be used to gather data indicating a degree of weight on wheels for the engine performance model 126, which can then signal the controller 114 to output a command to the scheduling valve 94. Weight on wheels may occur when the weight of an aircraft, on which the gas turbine engine 20 is mounted, is supported by the aircraft's wheels. The engine performance model 126 may include stored relationship values between a weight on wheels condition and a scheduling valve 94 position to provide a desired flow rate of lubricant 74 to one or more components of the gas turbine engine 20.

Further, a vibration sensor 158 can be used to gather data indicating a vibration level for the engine performance model 126, which can then signal the controller 114 to output a command to the scheduling valve 94. The vibration sensor 158 may be an accelerometer, and may be located at various positions within or on the gas turbine engine 20, including, but not limited to the nacelle 15, compressor 24, turbine 28, combustor 26, engine component 78, fan drive gear system 80, fan 42 or low or high speed spool 30, 32. The engine performance model 126 may include stored relationship values between a vibration condition and a scheduling valve 94 position to provide a desired flow rate of lubricant 74 to one or more components of the gas turbine engine 20.

The present disclosure allows for the successful lubrication and cooling of various gas turbine engine 20 components. Further, the disclosed lubrication system 70 may increase overall gas turbine engine 20 efficiency, as a regulated flow of lubricant 74 to the engine component 78 reduces mechanical losses, and eases the burden on de-aerators 102, filters 106 and coolers 110. In turn, this reduction may lead to decreased build, acquisition and maintenance costs, reduced system weight and improved system packaging.

Figure 4:
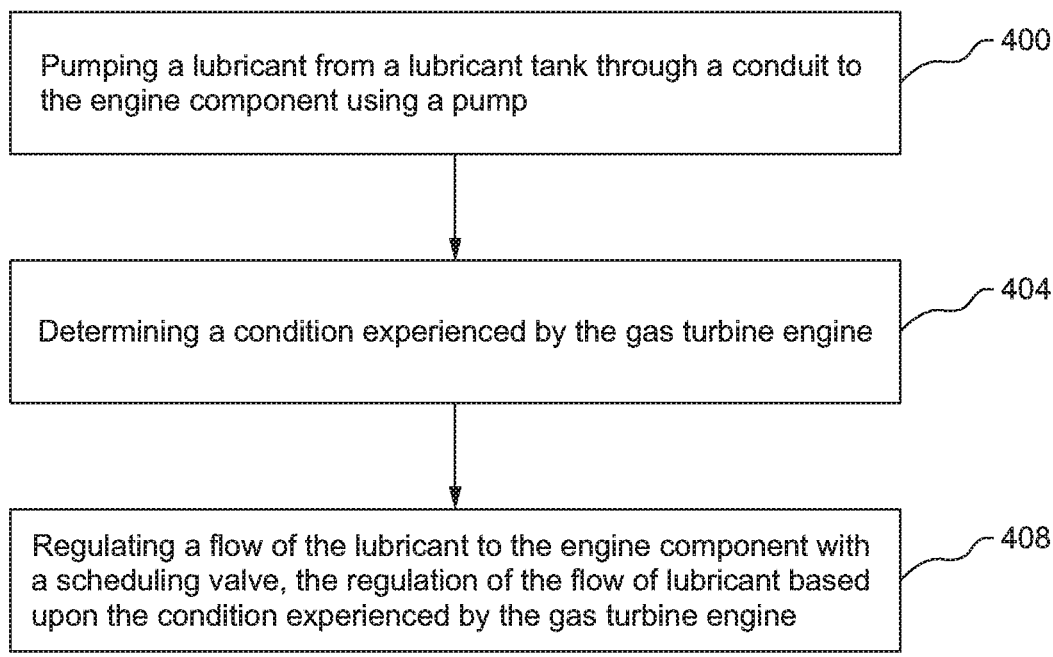
FIG. 4 is a flowchart depicting a sample sequence of actions and events which may be practiced in accordance with an embodiment.

The present disclosure not only sets forth a lubrication system 70, but a method of lubricating an engine component of a gas turbine engine as well. For example, such a method in operation can be understood by referencing the flowchart in FIG. 4. The method may comprise pumping a lubricant from a lubricant tank through a conduit to the engine component using a pump, as shown in box 400, and determining a condition experienced by the gas turbine engine, as shown in box 404. Further, the method may include regulating a flow of the lubricant to the engine component with a scheduling valve, the regulation of the flow of lubricant based upon the condition experienced by the gas turbine engine, as shown in box 408.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

In operation, the present disclosure sets forth a lubrication system for a gas turbine engine which can find industrial applicability in a variety of settings. For example, the disclosure may be advantageously employed by gas turbine engines in aviation, naval and industrial settings. More specifically, the lubrication system for a gas turbine engine can be used to successfully lubricate and cool gas turbine engine components, while refraining from over-lubricating the components in response to various conditions experienced by the gas turbine engine.

The present disclosure allows for the successful lubrication and cooling of various gas turbine engine components. Further, the disclosed lubrication system may increase overall gas turbine engine efficiency, as a regulated flow of lubricant to the engine component reduces mechanical losses, and eases the burden on de-aerators, filters and coolers. In turn, this reduction may lead to decreased build, acquisition and maintenance costs, reduced system weight and improved system packaging.

The lubrication system of the present disclosure contributes to the continued and efficient operation of a gas turbine engine. The disclosed system may be original equipment on new gas turbine engines, or added as a retrofit to existing gas turbine engines.

What is claimed is:

1. A lubrication system for a gas turbine engine, comprising:
   a pump that moves a lubricant;
   a lubricant tank that stores the lubricant;
   a first engine component and a second engine component each requiring lubrication from the lubricant, and wherein the first engine component is a fan drive gear system that allows a fan to rotate at a different angular speed from a spool;
   a conduit between the lubricant tank and the first engine component and between the lubricant tank and the second engine component;
   a scheduling valve positioned in the conduit between the lubricant tank, and the first engine component and the second engine component; and
   a controller including a memory and a processor that controls the scheduling valve, wherein the memory includes stored relationship values between more than one condition experienced by the gas turbine engine during operation and a position of the scheduling valve, and wherein the controller commands the scheduling valve to vary a flow of the lubricant to the first engine component, the second engine component and the lubricant tank.

2. The lubrication system of claim 1, wherein the scheduling valve at least partially diverts the flow of the lubricant to one of the first engine component, the second engine component and the lubricant tank.

3. The lubrication system of claim 1, further comprising a plurality of sensors that each provide data about a state of the gas turbine engine that indicates one of the more than one condition.

4. The lubrication system of claim 3, wherein the more than one condition includes two or more of: a calculated engine torque, an engine startup condition of the gas turbine engine, an altitude of the gas turbine engine, a vibration level of the gas turbine engine, a cruise condition of the gas turbine engine, a weight on wheels condition of an aircraft on which the gas turbine engine is mounted, and a burner pressure condition of a combustor.

5. The lubrication system of claim 4, wherein the more than one condition includes the burner pressure condition.

6. The lubrication system of claim 4, wherein the more than one condition includes the calculated engine torque, and the calculated engine torque includes a calculated torque for the fan.

7. The lubrication system of claim 4, wherein the more than one condition includes the engine startup condition.

8. The lubrication system of claim 4, wherein the more than one condition includes the altitude.

9. The lubrication system of claim 4, wherein the more than one condition includes the vibration level, and the plurality of sensors includes an accelerometer located in the fan drive gear system and that is used to gather data indicating the vibration level.

10. The lubrication system of claim 9, further comprising a de-aerator, a filter and a cooler each between the lubricant tank and the first engine component, and each between the lubricant tank and the second engine component.

11. The lubrication system of claim 4, wherein the more than one condition includes the cruise condition, and the cruise condition includes a cruise condition for the fan.

12. The lubrication system of claim 4, wherein the more than one condition includes the weight on wheels condition.

13. A gas turbine engine, comprising:
a fan section including a fan and an outer housing surrounding the fan to define a bypass duct;
a compressor section including a low pressure compressor and a high pressure compressor;
a combustion section including a combustor downstream of the compressor section;
a turbine section including a low pressure turbine and a high pressure turbine downstream of the combustor section;
a lubrication system including a pump that moves a lubricant;
a lubricant tank that stores the lubricant;
a first engine component and a second engine component each requiring lubrication from the lubricant, wherein the first engine component is a fan drive gear system that allows the fan to rotate at a different angular speed from a spool;
a conduit between the lubricant tank and the first engine component and between the lubricant tank and the second engine component;
a scheduling valve positioned in the conduit between the lubricant tank, and the first engine component and the second engine component; and
a controller including a memory and a processor that controls the scheduling valve, wherein the memory includes stored relationship values between more than one condition experienced by the gas turbine engine during operation and a position of the scheduling valve, and wherein the controller commands the scheduling valve to vary a flow of the lubricant to the first engine component, the second engine component and the lubricant tank.

14. The gas turbine engine of claim 13, wherein the spool is a low speed spool including a shaft that interconnects the fan, the low pressure compressor and the low pressure turbine, and wherein the shaft is connected to the fan through a geared architecture that drives the fan at a lower speed that the low speed spool.

15. The gas turbine engine of claim 14, wherein the fan section drives air along a bypass flow path in the bypass duct, and the compressor section drives air along a core flow path for communication into the combustion section.

16. The gas turbine engine of claim 14, further comprising a plurality of sensors that each provide data about a state of the gas turbine engine that indicates one of the more than one condition.

17. The gas turbine engine of claim 16, wherein the fan section drives air along a bypass flow path in the bypass duct, and the compressor section drives air along a core flow path for communication into the combustion section.

18. The gas turbine engine of claim 17, wherein the pump is driven by a rotating component of the gas turbine engine.

19. The gas turbine engine of claim 18, wherein the more than one condition includes a calculated engine torque.

20. The gas turbine engine of claim 19, wherein the calculated engine torque includes a calculated torque for the fan.

21. The gas turbine engine of claim 16, wherein the more than one condition includes an altitude of the gas turbine engine.

22. The gas turbine engine of claim 21, wherein the more than one condition includes a cruise condition for the fan.

23. The gas turbine engine of claim 16, wherein the more than one condition includes a burner pressure condition within the combustor.

24. The gas turbine engine of claim 16, wherein the more than one condition includes an engine startup condition of the gas turbine engine.

25. The gas turbine engine of claim 16, wherein the more than one condition includes a vibration level of the fan drive gear system.

26. The gas turbine engine of claim 25, wherein the plurality of sensors includes a vibration sensor located in the fan drive gear system and that is used to gather data indicating the vibration level, and the geared architecture is a planetary gear train.

* * * * *